United States Patent
Szonn et al.

(12) 
(10) Patent No.: US 6,436,530 B1
(45) Date of Patent: *Aug. 20, 2002

(54) MULTILAYER ADHESIVE TAPE

(75) Inventors: Bodo Szonn, Wasbek; Worner Kluge-Paletta, Buchholz; Werner Karmann, Hamburg, all of (DE)

(73) Assignee: tesa AG, Hamburg (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/207,814

(22) Filed: Dec. 9, 1998

(30) Foreign Application Priority Data

Dec. 23, 1997 (DE) .......................... 197 57 426

(51) Int. Cl.⁷ .............................. C09J 7/02; B32B 27/34; B32B 7/12
(52) U.S. Cl. ........................ 428/354; 428/343; 428/345; 428/355 AC; 428/474.4; 427/208; 156/244.11
(58) Field of Search ................................ 428/343, 345, 428/354, 355 AC, 474.4; 427/208; 156/244.11

(56) References Cited

U.S. PATENT DOCUMENTS

| | | | | |
|---|---|---|---|---|
| 4,440,829 A | * | 4/1984 | Gerace et al. | 428/343 |
| 4,952,447 A | * | 8/1990 | Phillips et al. | 428/318.6 |
| 5,484,848 A | | 1/1996 | Jadamus et al. | 535/105 |
| 5,612,107 A | * | 3/1997 | Sangani et al. | 428/41.7 |
| 5,660,922 A | * | 8/1997 | Herridge et al. | 428/214 |
| 5,688,589 A | | 11/1997 | Schacht et al. | 428/317.3 |

FOREIGN PATENT DOCUMENTS

| | | | |
|---|---|---|---|
| DE | 19603919 | 8/1996 | C09J/7/02 |
| DE | 19716996 | 6/1998 | B29C/47/06 |
| EP | 0874034 | 10/1998 | C09J/7/02 |
| WO | 9718275 | 5/1997 | C09J/7/02 |

OTHER PUBLICATIONS

Derwent Abstract of DE 19603919 A1 (Aug. 29, 1996).

* cited by examiner

*Primary Examiner*—Daniel Zirker
(74) *Attorney, Agent, or Firm*—Norris McLaughlin & Marcus

(57) ABSTRACT

A single- or double-sided pressure-sensitive adhesive tape having an elastomeric backing layer, wherein a) the framework substance of the backing layer consists essentially of natural rubber or of a mixture of natural rubber and at least one styrenebutadiene rubber, b) an essential constituent of the backing layer is an electron beam-crosslinkable, polyfunctional crosslinker, c) a pressure-sensitive adhesive is applied to one or both sides of the backing layer, and d) between backing layer and pressure-sensitive adhesive there is an interlayer of a polyamide or of a mixture of polyamides.

15 Claims, No Drawings

MULTILAYER ADHESIVE TAPE

The invention relates to an adhesive tape which has been given a pressure-sensitive adhesive coating, having an elastomeric backing layer, a single- or double-sided energy-elastic interlayer and a pressure-sensitive adhesive layer on one or both sides.

The use of interlayers between the actual backing layer and the pressure-sensitive adhesive coating is known. One of the purposes of these interlayers is to prevent or lessen the migration of constituents from the backing layer into the pressure-sensitive adhesive. Migration of this kind may lead to structural alterations in the pressure-sensitive adhesive layer and/or to deposits on the surface of the pressure-sensitive adhesive, and hence to a reduction in the adhesion. A further function of the interlayers is to smooth out uneven backing surfaces.

In the case of the bonded adhesive tape, interlayers—especially if they are energy-elastically deformable—may have the function of absorbing stress peaks greater than the average force acting on the bond area and of distributing such peak stresses over the area of the bond in order thereby to counter fracture of the bond.

For example, it is known for this application to use thin layers of polymers which are in an energy-elastic state thermodynamically owing to their high glass transition temperature and/or their partial crystallinity. Polyamides in particular meet the requirements that are placed on an interlayer.

A disadvantage of the interlayers consisting of polyamides, however, is that, while they often fulfil the barrier, smoothing and force-absorbing function, at the same time their adhesion to the underlying backing is inadequate. At relatively high stress levels, especially in the case of stresses in which peel forces become active, there is a possibility that the adhesive tape might suffer delamination, instances of which may lead to complete failure of the bond.

The object of the invention, therefore, was to provide an adhesive tape which, with an elastomeric backing layer, has an energy-elastic interlayer anchored securely on the backing layer.

To achieve this object the invention proposes an adhesive tape which has been given a single- or double-sided pressure-sensitive adhesive treatment and has an elastomeric backing layer, the polymeric framework of the backing layer consisting essentially of natural rubber or of a mixture of natural rubber with at least one styrene-butadiene rubber.

The styrene-butadiene rubber of the backing layer can be a random copolymer having a styrene content of about 23% by weight. The natural rubber or mixture of natural rubber with styrene-butadiene rubber that is used for the backing layer is crosslinkable by means of electron beams.

In accordance with the invention the backing layer comprises an electron beam-crosslinkable, polyfunctional crosslinker, preferably oligoacrylate or oligovinyl ether, which is partially soluble in the polymeric framework and whose physical forces of interaction with the polymeric framework are so low that it tends towards diffusion to the surface of the backing layer where, together with its fraction which is not dissolved in the polymeric framework, it forms a thin film which contacts the entire area of the polyamide interlayer.

In that case the electron beam-crosslinkable polyfunctional crosslinker is at least partially soluble in the polyamide and is therefore able to diffuse into it. Irradiation with electrons crosslinks the pure framework of the backing, the framework of the backing together with the crosslinker, the pure crosslinker dispersed in the backing, the crosslinker present like a film on the surface of the backing, and those fractions of the crosslinker that have diffused into the polyamide interlayer, this crosslinking possibly taking place with attachment to the polyamide, so that an indissoluble, predominantly covalent attachment of the interlayer to the backing is achieved.

It is advantageous if the combined product composed of backing, crosslinker film and polyamide is irradiated with electrons before the latter has diffused to that side of the polyamide which is opposite the rubber backing.

The combined product can be irradiated, for example, with an electron accelerator of the scanner type at a radiation dose of from 10 to 200 kGy, preferably from 50 to 100 kGy and, with particular preference, 80 kGy. The required acceleration voltage depends on the thickness of the combined product that is to be crosslinked. To achieve sufficient homogeneity of crosslinking, the combined product can be irradiated from both sides.

The crosslinked combined product composed of backing, crosslinker film and polyamide interlayer preferably carries, on the interlayer, a polyacrylate-based pressure-sensitive adhesive, which may or may not be crosslinked.

The pressure-sensitive adhesive can be crosslinked separately on an auxiliary support or in combination with interlayer and backing by means of a chemical reaction, via an inherent mechanism and/or physically by irradiation with electrons in the course of the crosslinking of the backing with the interlayer.

The crosslinker which is supplied to the backing, diffuses onto its surface as a soluble fraction and is deposited there, inter alia, as an insoluble fraction, and which, following partial diffusion into the adjacent polyamide interlayer, brings about anchorage of the interlayer to the backing following its crosslinking with electron beams, is a polyfunctional—especially di-, tri- or tetrafunctional—oligoacrylate or an oligovinyl ether having terminal, electron beam-crosslinkable vinyl groups. The base compound carrying the vinyl groups may, for example, be an ethoxylated or non-ethoxylated polyol, an oligoether, or an oligourethane having terminal OH groups.

In accordance with the invention the crosslinker can be admixed alone or in a blend with one or more other crosslinkers of the same or different functionality to the backing formulation.

For example, a bifunctional urethane acrylate having an average molecular weight of 5000 or a tetrafunctional oligoether acrylate having an average molecular weight of 1000 or a tetrafunctional oligoether acrylate, such as ethoxylated trimethylolpropane triacrylate, can be employed per se. It is also possible, however, to blend the bifunctional urethane acrylate or the tetrafunctional oligoether acrylate in equal or unequal parts with the trifunctional ethoxylated trimethylolpropane triacrylate.

Preferably, the crosslinker or the mixture of different crosslinkers is added to the backing formulation in an amount of from 5 to 20% by weight, especially 7% by weight.

To increase the durability of the backing it can be admixed with customary anti-ageing agents, which, depending on the particular application, may originate from the class of the discolouring or non-discolouring anti-ageing agents, in particular in the range from 0 to 10 phr, and also with known light stabilizers or ozone protectants. Blending with plasticizers is also possible.

In order establish specifically the desired properties of the backing it is possible if desired to use fillers. For instance, the natural rubber or the mixture of natural rubber and styrene-butadiene rubber can be admixed with reinforcing, semi-reinforcing or non-reinforcing carbon blacks, in particular at from 0 to 50 phr, with zinc oxide, in particular at from 0 to 50 phr, and/or with other fillers, such as silica, silicates or chalk. Fillers other than those mentioned can also be used. It is possible in addition to add resins from the class of the phenolic resins and/or hydrocarbon resins, in the range, in particular, of from 0 to 50 phr. Depending on the intended application of the adhesive tape, all of these additives referred to can be employed either alone or in any desired combination with one another to produce the backing, in order to obtain optimum tailoring to the utility. Through the use of these additives it is also readily possible to provide the black coloration of the backing which is generally required by the industry.

The backing layer has a thickness of from 400 to 3000 $\mu$m, in particular from 500 to 1400 $\mu$m.

The backing mixture is preferably prepared in an internal mixer of the kind typically used for elastomer compounding. Processing takes place preferably without solvent. The electron beam-crosslinkable polyfunctional crosslinker and the desired fillers may be added to the natural rubber or to the mixture of natural rubber with styrene-butadiene rubber at the same time. The resulting mixture can subsequently be extruded or calendered to the desired thickness on customary commercial machines. This gives a backing layer thickness that is within the ranges set out above.

In a preferred embodiment the interlayer consists of a polyamide or of a mixture of polyamides in which polyfunctional oligoacrylates are partly soluble; for example, it consists of an amorphous ternary copolyamide having alicyclic units, which copolyamide may have been blended with minor amounts of a partially crystalline polyaminoamide. In that case it is possible to use a polyamide which includes alicyclic segments or a mixture of polyamides whose excess component includes alicyclic segments.

In this context, the interlayer can be produced in a separate operation from the solution or without solvent, by extrusion with or without an auxiliary support, specifically in a thickness of from 5 to 40 $\mu$m, especially 8 $\mu$m. If an auxiliary support is used, the interlayer can be peeled from this support again with no restrictions.

The pressure-sensitive adhesive consists preferably of copolymers of 2-ethylhexyl acrylate, butyl acrylate, methyl acrylate and acrylic acid, preferably with a composition of from 50 to 70% by weight 2-ethylhexyl acrylate and/or butyl acrylate, from 20 to 40% by weight methyl acrylate, and from 0 to 10% by weight acrylic acid.

The addition of further, known components is possible in order to obtain certain properties, especially the addition of further comonomers, crosslinkers, tackifier resins and antiageing agents. The pressure-sensitive adhesive can be processed as a solution, dispersion or melt. It can be applied directly or by the transfer technique to the interlayer. Chemical crosslinking of the pressure-sensitive adhesive with crosslinking agents and/or physical crosslinking with electron beams is advantageous. The applied weight of the pressure-sensitive adhesive can likewise be chosen arbitrarily in dependence on the intended use, within the range from 10 to 250 g/m$^2$, preferably from 40 to 150 g/m$^2$. Furthermore, one or both pressure-sensitive adhesive layers may be covered with a release paper, preferably with a double-sidedly anti-adhesively coated masking paper or with a polyolefin-based film. The film can have been anti-adhesively treated on both sides.

Also embraced by the concept of the invention are processes for producing an adhesive tape of the invention.

In one preferred production process the backing layer, one or both interlayers and one or both coats of the pressure-sensitive adhesive are brought together by a laminating process.

In a second preferred process, the backing layer is first of all shaped by a calendering process on the ready-formed interlayer, which is supported by an auxiliary support. The other side of the backing layer is then covered, if desired, with a second interlayer, including auxiliary support, or, in the case of an auxiliary support provided on both sides with an interlayer, is joined with the second interlayer on the other side while the laminate is being wound up into a roll. As soon as the crosslinker film on the backing surface has come into contact with the polyamide of the interlayer, the dissolution and diffusion of the crosslinker into the polyamide begins. Experience has shown that the unreacted crosslinker present on the surface of the interlayer is able to diffuse into the pressure-sensitive adhesive and bring about a deterioration in the force of its adhesion to substrates encountered in practice. Likewise, fractions of the crosslinker which have already been crosslinked, on the surface of the interlayer, may reduce the spontaneous adhesion of the pressure-sensitive adhesive on the interlayer. It is therefore advantageous for the laminate composed of backing and interlayer to be irradiated with electrons before the crosslinker has diffused to the interlayer surface opposite the backing. In the next step of the process the auxiliary support or supports is or are peeled off, and, finally, the pressure-sensitive adhesive is applied directly or by the transfer technique to one or both interlayers.

The present invention describes the construction of a self-adhesive tape which exploits the electron beam crosslinkability of a polyfunctional (at least bifunctional) crosslinker which is partially soluble, and therefore diffuses to the surface of the backing, and is partially insoluble, and therefore becomes deposited, inter alia, on the surface of the backing, this crosslinker being in uninterrupted contact with that fraction that has remained in the backing as well as with that fraction which has diffused into the interlayer. The self-adhesive tape backing of the invention consists of natural rubber or of a mixture of natural rubber with a styrene-butadiene rubber, and the interlayer of the invention consists of polyamide which comprises alicyclic segments and in which the polyfunctional crosslinker is soluble. The firm connection of the two layers, brought into contact with one another preferably by dry lamination, is brought about essentially by the electron-beam curing of the polyfunctional crosslinker. The resulting anchorage of the interlayer on the backing ensures that there is no delamination of the adhesive tape, even under high stresses.

The diffusion of the crosslinker to the surface of the backing and further into the polyamide interlayer, this diffusion preceding irradiation with electrons, takes place spontaneously at room temperature and can be accelerated by elevated temperature. The highest level of adhesion of the pressure-sensitive adhesive on the interlayer is obtained when irradiation with electrons is carried out before the crosslinker has diffused to the interlayer surface facing the pressure-sensitive adhesive. The time required by the crosslinker to reach that surface is of course influenced by the composition and thickness of the interlayer, by the structure of the crosslinker, by its solubility in the interlayer and by the temperature. Experience has shown that, with an adhesive tape construction in the preferred embodiment of the invention, there is no adverse effect on the adhesion of the pressure-sensitive adhesive in the above sense until the uncrosslinked combination product of backing and interlayer with free, diffusable crosslinker is stored at a temperature of up to 40° C. for more than 4 weeks.

In the text below the invention will be elucidated further, with examples, without wishing thereby to restrict the invention unnecessarily.

EXAMPLES

Example 1

The basis was a backing layer having the composition in Table 1.

TABLE 1

Composition of the backing layer for Example 1

| Constituents | Parts by weight |
| --- | --- |
| Natural rubber (standard Malaysian rubber CV 50) | 41 |
| Polyisoprene having a molecular weight of 2900, as plasticizer | 8 |
| Liquid hydrocarbon resin having a viscosity of from 20 to 40 Pas at 25° C., as plasticizer | 7 |
| Prepared chalk | 30.7 |
| Semi-active furnace black N 772 | 6.5 |
| Anti-ageing agent 2,2'-methylenebis(4-methyl-6-tert-butylphenol) | 0.8 |
| Polyfunctional crosslinker | 6 |

The framework polymer used was a viscosity-stabilized standard Malaysian rubber CV 50, the following being employed alternatively as the polyfunctional crosslinker:
a) a bifunctional urethane acrylate having an average molecular weight of 5,000 and a viscosity of 40 Pas at 25° C. (Ebecryl 230 from UCB Chemicals),
b) a trifunctional oligoether acrylate based on a trimethylolpropane having a viscosity of 80 mPas at 25° C. (Ebecryl 160 from UCB Chemicals),
c) a mixture of equal parts of both of these
d) a tetrafunctional oligoether acrylate having an average molecular weight of 1,000 and a viscosity of 3.5 Pas at 25° C. (Ebecryl 80 from UCB Chemicals)
e) a tetrafunctional oligoether acrylate having an average molecular weight of 1000 and a viscosity of 3.5 Pas at 25° C. in a mixture with the ethoxylated trimethylolpropane triacrylate (Ebecryl 160 from UCB Chemicals) in equal parts.

Also used were the fillers chalk and carbon black, and also two plasticizers and a phenolic anti-ageing agent.

The constituents were mixed together in an internal mixer under the conditions customary in the rubber industry.

The interlayer was prepared from an aqueous/alcoholic solution of a mixture of 65 parts by weight of an amorphous ternary copolyamide having alicyclic units (Ultramid 1C from BASF) and 35 parts by weight of a partially crystalline polyiminoamide (Platamid M 1276 from Atochem) by spreading and drying in a coat thickness of 8 μm on a polyethylene terephthalate film.

The backing mixture was shaped and applied by means of a calender to an auxiliary support coated on both sides with the interlayer, the resulting assembly being 0.5 mm thick and being wound up into a roll so that the reverse side of the backing comes into contact with the interlayer that was facing away from the backing during its shaping. The auxiliary support employed was a 25 to 50 μm thick polyethylene terephthalate film. In the course of storage in roll form, there is partial diffusion of the crosslinker from the backing into the interlayer on both sides of the laminate.

Both sides of the laminate of backing and interlayers were then crosslinked with electron beams over the course of 24 hours with a radiation dose of 100 kGy.

The crosslinked samples produced in this way were examined for the adhesion of the interlayer to the backing, which was compared with that of uncrosslinked samples. For this purpose, the auxiliary support for the interlayers was first of all removed. Then one side of the laminate was reinforced with a pressure-sensitive adhesive tape. On the other side of the sample, a 30 mm wide strip of a filament-reinforced pressure-sensitive adhesive tape which is obtainable commercially as tesapack 4588 was stuck onto the interlayer, avoiding air-inclusion bubbles, and a roller weighing 5 kp was rolled over the assembly 4 times. On test strips cut to a width of 20 mm, the peeled strength of the interlayer—now bonded to the filament-reinforced pressure-sensitive adhesive tape—from the backing was measured using a tensile testing machine at a peel rate of 300 mm/min.

TABLE 2

Peel force of interlayer from backing

| | Peel force [N/cm] | |
| --- | --- | --- |
| Crosslinker with which the backing was blended | Non-EB-crosslinked backing/interlayer laminate | Backing/interlayer laminate EB crosslinked at 100 kGy |
| None | 0.2 | 0.4 |
| Ebecryl 230 | 0.6 | 2 |
| Ebecryl 160 | 0.3 | >6 |
| 1 part by wt. Ebecryl 160 + 1 part by wt. Ebecryl 230 | 0.2 | >6 |
| 1 part by wt. Ebecryl 160 + 1 part by wt. Ebecryl 80 | 0.4 | >6 |

The crosslinked backing described above, which is now attached firmly on both sides to an interlayer, was coated on both sides with a pressure-sensitive adhesive. The pressure-sensitive adhesive was applied in a dry film thickness of 50 μm to an anti-adhesively treated auxiliary support and was dried at a temperature of more than 100° C. in order to induce crosslinking.

To produce the adhesive tape of the invention the dried, crosslinked pressure-sensitive adhesive was laminated by the transfer technique onto the interlayer exposed after the backing had been unrolled, following removal of the auxiliary support for the interlayer.

The pressure-sensitive adhesive employed was a copolymer of methyl acrylate with 2-ethylhexyl acrylate and acrylic acid which crosslinks at a temperature upwards of 100° C. with 0.5% of an acetylacetone-based chelate formed with titanium. The copolymer described has the following composition:

30% by weight methyl acrylate

60% by weight 2-ethylhexyl acrylate

10% by weight acrylic acid

Example 2

A double-sided pressure-sensitive adhesive tape was produced by the procedure described in Example 1. The backing used was a mixture having the following composition:

TABLE 3

Composition of the backing layer for Example 2

| Constituents | Parts by weight |
|---|---|
| Natural rubber (standard Malaysian rubber CV 50) | 62.7 |
| Prepared chalk | 24.7 |
| Semi-active furnace black N 772 | 6.2 |
| Anti-ageing agent 2,2'-methylenebis(4-methyl-6-tert-butylphenol) | 1.4 |
| Polyfunctional oligoacrylate | 5 |

The polyfunctional oligoacrylate used was ethoxylated trimethylolpropane triacrylate having a viscosity of 25° C. of 80 mPas (Ebecryl 160 from UCB Chemicals).

The interlayer employed is again the mixture of two polyamides described in Example 1.

The pressure-sensitive adhesive employed was an acrylate-based copolymer having the composition described in Example 1.

In order to study the time effect in the diffusion of the uncrosslinked oligoacrylate through the interlayers to their surfaces, the uncrosslinked laminate comprising the backing and the interlayers was stored for different periods of time at 20° C. and 40° C., and only then was crosslinked with electron beams.

The pressure-sensitive adhesive was then laminated by the transfer technique onto the interlayers and the overall construction was stored at 70° C. for one week in order, for the purpose of optimum adhesion, to allow the pressure-sensitive adhesive to flow onto the interlayers. The samples produced in this way were subjected to a shear load at 70° C. For this purpose one pressure-sensitive adhesive side of a sample was reinforced with a 50 µm thick aluminium foil. From this assembly there was cut a 13 mm wide and over 20 mm long strip which along a length of 20 mm of its pressure-sensitive adhesive, free side was bonded to a finely polished steel plate and rolled firm 4 times with a roller weighing 2 kp. The end of the vertically positioned sample that protrudes beyond the steel plate was subjected to a weight of 10 N. The test was conducted in a drying cabinet at 70° C. The fracture behaviour of the samples under load was observed.

TABLE 4

Shear stabilities at 70° C. of backing/interlayer laminates stored for different periods in the uncrosslinked state.

| Storage period of the backing/interlayer laminate prior to EB crosslinking | Shear Stability [min] | |
|---|---|---|
| | Storage at 20° C. | Storage at 40° C. |
| no storage | >20,000 min | |
| 2 weeks | >20,000 min | >20,000 min |
| 4 weeks | >20,000 min | >20,000 min |
| 12 weeks | 800 min adhesive fracture between PSA and interlayer | 900 min adhesive fracture between PSA and interlayer |

The table shows that a significant drop in the shear stability occurs only when the laminate composed of backing and interlayer is stored for more than 4 weeks at a temperature of up to 40° C. prior to electron beam (EB) crosslinking, so that it can be assumed that in the case of the exemplary construction the diffusion of the oligoacrylate to the surface of the interlayer takes more than 4 weeks. Before this time, no reduction is expected in the adhesion of the pressure-sensitive adhesive (PSA) on the interlayer as a result of crosslinked oligoacrylate in the case of the exemplary construction.

What is claimed is:

1. Single- or double-sided pressure sensitive adhesive tape having an elastomeric backing layer, comprising
    a) a backing layer comprising:
        (i) as the major component a natural rubber, or a mixture of natural rubber and at least one styrene-butadiene rubber, and
        (ii) a crosslinker chosen from the group consisting of an oligoacrylate and an oligovinyl ether, where the oligovinyl ether is chosen from the group consisting of a polyol, an oligoether and an oligourethane, each having at least two terminal vinyl groups,
    b) an interlayer of a polyamide, or a mixture of polyamides applied to one or both sides of said backing layer, and
    c) a pressure-sensitive adhesive applied to said interlayer on one or both sides of the backing layer,
    wherein said crosslinker is diffused into a side of the interlayer facing said backing layer, but wherein the crosslinker is substantially not diffused through to the surface of a second, opposite side of the interlayer facing said adhesive.

2. Adhesive tape according to claim 1 wherein said vinyl-terminated polyol is ethoxylated.

3. Adhesive tape according to claim 2 wherein said vinylterminal, ethoxylated oligoether is ethoxylated trimethylolpropane triacrylate.

4. Adhesive tape according to claim 1, wherein the electron beam-crosslinkable, polyfunctional crosslinker is present in an amount of from 5 to 20% by weight of said major component of the backing layer.

5. Adhesive tape according to claim 1, wherein the interlayer consists of a polyamide which comprises alicyclic segments or of a mixture of polyamides whose excess component comprises alicyclic segments.

6. Adhesive tape according to claim 1, wherein the interlayer has a thickness of from 5 to 40 µm.

7. Adhesive tape according to claim 1, wherein the interlayer is produced by extrusion with or without auxiliary supports.

8. Adhesive tape according to claim 1, wherein the interlayer is prepared from solution on an auxiliary support.

9. Adhesive tape according to claim 1, wherein the pressure-sensitive adhesive coating consists of a copolymer of 2-ethylhexyl acrylate and/or butyl acrylate with methyl acrylate and acrylic acid, with or without further comonomers.

10. Adhesive tape according to claim 9, wherein the pressure-sensitive adhesive coating has the following composition:
    from 50 to 70% by weight of 2-ethylhexyl acrylate and/or butyl acrylate,
    from 20 to 40% by weight of methyl acrylate,
    from 0 to 10% by weight of acrylic acid with or without further comonomers.

11. Adhesive tape according to claim 1, wherein the combined backing layer and interlayer, with or without pressure sensitive adhesive coating, is crosslinked with electron beams at a radiation dose of from 10 to 200 kGy.

12. Process for producing the adhesive tape of claim 1, wherein the backing layer, the one or two interlayers and the one or two coats of the pressure-sensitive adhesive are brought together by a laminating process.

13. Process for producing the adhesive tape of claim 1, wherein the backing layer is shaped by a calendering process on the ready-formed interlayer, which is supported by an auxiliary support, optionally, the backing layer is covered on the side opposite the first-applied interlayer by a second interlayer, optionally together with an auxiliary support, the backing layer and the interlayer or interlayers are irradiated with electrons at a time prior to diffusion of the crosslinker through to the second face of the interlayer or interlayers, the auxiliary support or supports is or are then peeled off, and a self-adhesive coating is applied to each of the one or two interlayers.

14. The adhesive tape of claim 1, wherein said electron beam crosslinkable polyfunctional crosslinker has been added to said backing layer by mixing it with the composition from which the backing layer is formed.

15. The adhesive tape of claim 1, wherein said electron beam crosslinkable polyfunctional crosslinker forms a layer on the surface of the backing layer to which the interlayer is applied.

* * * * *

UNITED STATES PATENT AND TRADEMARK OFFICE
CERTIFICATE OF CORRECTION

PATENT NO.     : 6,436,530 B1  
DATED          : August 20, 2002  
INVENTOR(S)    : Bodo Szonn et al.

Page 1 of 1

It is certified that error appears in the above-identified patent and that said Letters Patent is hereby corrected as shown below:

<u>Title page,</u>  
Item [75], Inventors, change second inventor's first name from "Worner" to -- Werner --

Signed and Sealed this

Twenty-fourth Day of December, 2002

JAMES E. ROGAN  
*Director of the United States Patent and Trademark Office*